United States Patent
Khoshnevisan et al.

(10) Patent No.: US 11,108,496 B2
(45) Date of Patent: Aug. 31, 2021

(54) INTERFERENCE MUTING AND BLIND DECODING FOR URLLC RETRANSMISSIONS

(71) Applicant: QUALCOMM Incorporated, San Diego, CA (US)

(72) Inventors: Mostafa Khoshnevisan, San Diego, CA (US); Farhad Meshkati, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/273,834

(22) Filed: Feb. 12, 2019

(65) Prior Publication Data

US 2019/0253186 A1 Aug. 15, 2019

Related U.S. Application Data

(60) Provisional application No. 62/630,614, filed on Feb. 14, 2018.

(51) Int. Cl.
*H04L 1/00* (2006.01)
*H04L 5/00* (2006.01)
(Continued)

(52) U.S. Cl.
CPC .......... *H04L 1/0038* (2013.01); *H04L 1/0003* (2013.01); *H04L 1/0009* (2013.01); *H04L 1/08* (2013.01); *H04L 1/189* (2013.01); *H04L 1/1858* (2013.01); *H04L 1/1861* (2013.01); *H04L 1/1864* (2013.01); *H04L 1/1893* (2013.01);
(Continued)

(58) Field of Classification Search
CPC ... H04L 1/0026; H04L 1/0027; H04L 1/1861; H04L 1/1819; H04L 1/1829; H04L 1/1893; H04L 1/20; H04W 72/00; H04W 72/048; B29C 44/04; B29C 44/3453;
(Continued)

(56) References Cited

U.S. PATENT DOCUMENTS

2008/0056229 A1\* 3/2008 Gholmieh ............. H04L 1/1896
370/349
2010/0238818 A1\* 9/2010 Takaoka ................. H04L 1/1671
370/252
(Continued)

OTHER PUBLICATIONS

Samsung: "PBCH Coverage Enhancements for MTC UEs," 3GPP Draft; R1-135195 MTC Coverage PBCH, 3RD Generation Partnership Project (3GPP); ; FRANCE, vol. RAN WG1, No. San Francisco, USA; Nov. 11, 2013-Nov. 15, 2011 Nov. 13, 2013 (Nov. 13, 2013) (Year: 2013).\*
(Continued)

*Primary Examiner* — Elton Williams
(74) *Attorney, Agent, or Firm* — Harrity & Harrity LLP

(57) ABSTRACT

Various aspects of the present disclosure generally relate to wireless communication. In some aspects, a wireless communication device may transmit a first transmission using a first resource, and transmit a retransmission of the first transmission using a second resource, wherein the second resource is configured from a plurality of second resources based at least in part on an interference muting configuration of the wireless communication device. Numerous other aspects are provided.

30 Claims, 6 Drawing Sheets

(51) Int. Cl.
  *H04W 76/27* (2018.01)
  *H04L 1/18* (2006.01)
  *H04L 1/08* (2006.01)
(52) U.S. Cl.
  CPC .......... *H04L 1/1896* (2013.01); *H04L 5/0055* (2013.01); *H04L 5/0073* (2013.01); *H04L 5/0094* (2013.01); *H04W 76/27* (2018.02)
(58) Field of Classification Search
  CPC . B29C 44/5627; B29C 44/005; B29C 44/023; B29C 67/20
  See application file for complete search history.

(56) References Cited

U.S. PATENT DOCUMENTS

| | | | | |
|---|---|---|---|---|
| 2015/0029964 A1* | 1/2015 | Seo | ...................... | H04L 5/001 370/329 |
| 2015/0103781 A1* | 4/2015 | Wu | ...................... | H04W 4/70 370/329 |
| 2015/0296540 A1* | 10/2015 | Yum | .................. | H04B 7/024 370/329 |
| 2016/0183291 A1* | 6/2016 | Manssour | ............ | H04L 5/0055 370/329 |
| 2018/0213528 A1* | 7/2018 | Lee | ...................... | H04L 5/0044 |
| 2019/0036585 A1* | 1/2019 | Hosseini | ............ | H04W 72/042 |

OTHER PUBLICATIONS

Huawei, et al., "UE Procedure of PDCCH Monitoring for URLLC," 3GPP Draft; 3GPP TSG RAN WG1 Meeting #90bis, R1-1717084, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340275, 6 pages, Retrieved from the Internet: URL: http://www.3gpp.org/ftp/Meetings_3GPP_SYNC/RAN1/Docs/ [retrieved on Oct. 8, 2017].
International Search Report and Written Opinion—PCT/US2019/017829—ISA/EPO—Apr. 23, 2019.
Motorola Mobility: "Support for Common Search Space for EPDCCH", 3GPP Draft; 3GPP TSG RAN WG1 #68bis, R1-121585 Common Search Space EPDCCH Final, 3RD Generation-Partnership Project (3GPP), Mobile Competence Centre, 650, Route Des Lucioles, F-06921 Sophia-Antipolis Cedex; France, vol. RAN WG1, No. Jeju, Korea; Mar. 26, 2012-Mar. 30, 2012, Mar. 20, 2012 (Mar. 20, 2012), XP050599849, pp. 1-3, [retrieved on Mar. 20, 2012].
Samsung: "PBCH Coverage Enhancements for MTC UEs", 3GPP DRAFT; 3GPP TSG RAN WG1 #71, R1-135195, MTC Coverage PBCH, 3RD Generation Partnership Project (3GPP), Mobile Competence Centre, 650, Route Des Lucioles, F-06921 Sophia-Antipolis Cedex, France, vol. RAN WG1, No. San Francisco, USA; Nov. 11, 2013-Nov. 15, 2013, Nov. 13, 2013 (Nov. 13, 2013), XP050734893, pp. 1-4, Retrieved from the Internet: URL:http://www.3gpp.org/ftp/Meetings_3GPP_SYNC/RAN/RAN1/Docs/ —[retrieved on Nov. 13, 2013].

* cited by examiner

INTERFERENCE MUTING AND BLIND DECODING FOR URLLC RETRANSMISSIONS

CROSS-REFERENCE TO RELATED APPLICATIONS UNDER 35 U.S.C. § 119

This application claims priority to Provisional Patent Application No. 62/630,614, filed on Feb. 14, 2018, entitled "TECHNIQUES AND APPARATUSES FOR INTERFERENCE MUTING AND BLIND DECODING FOR URLLC RETRANSMISSIONS" which is hereby expressly incorporated by reference herein.

FIELD OF THE DISCLOSURE

Aspects of the present disclosure generally relate to wireless communication, and more particularly to techniques and apparatuses for interference muting and blind decoding for ultra-reliable low latency communication (URLLC) retransmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a base station may include transmitting a first transmission using a first resource; and transmitting a retransmission of the first transmission using a second resource, wherein the second resource is configured from a plurality of second resources based at least in part on an interference muting configuration of the base station.

In some aspects, a base station for wireless communication may include memory and one or more processors operatively coupled to the memory. The memory and the one or more processors may be configured to transmit a first transmission using a first resource; and transmit a retransmission of the first transmission using a second resource, wherein the second resource is configured from a plurality of second resources based at least in part on an interference muting configuration of the base station.

In some aspects, a non-transitory computer-readable medium may store one or more instructions for wireless communication. The one or more instructions, when executed by one or more processors of a base station, may cause the one or more processors to transmit a first transmission using a first resource; and transmit a retransmission of the first transmission using a second resource, wherein the second resource is configured from a plurality of second resources based at least in part on an interference muting configuration of the base station.

In some aspects, an apparatus for wireless communication may include means for transmitting a first transmission using a first resource; and means for transmitting a retransmission of the first transmission using a second resource, wherein the second resource is configured from a plurality of second resources based at least in part on an interference muting configuration of the apparatus.

In some aspects, a method of wireless communication performed by a UE may include receiving information identifying a set of parameters of a base station, wherein the set of parameters is for a retransmission of a first transmission by the base station and wherein the set of parameters define a set of hypotheses for blind decoding to receive the retransmission; and receiving the retransmission by performing blind decoding based at least in part on the set of parameters.

In some aspects, a UE for wireless communication may include memory and one or more processors operatively coupled to the memory. The memory and the one or more processors may be configured to receive information identifying a set of parameters of a base station, wherein the set of parameters is for a retransmission of a first transmission by the base station and wherein the set of parameters define a set of hypotheses for blind decoding to receive the retransmission; and receive the retransmission by performing blind decoding based at least in part on the set of parameters.

In some aspects, a non-transitory computer-readable medium may store one or more instructions for wireless communication. The one or more instructions, when executed by one or more processors of a UE, may cause the one or more processors to receive information identifying a set of parameters of a base station, wherein the set of parameters is for a retransmission of a first transmission by the base station and wherein the set of parameters define a set of hypotheses for blind decoding to receive the retransmission; and receive the retransmission by performing blind decoding based at least in part on the set of parameters.

In some aspects, an apparatus for wireless communication may include means for receiving information identifying a set of parameters of a base station, wherein the set of parameters is for a retransmission of a first transmission by the base station and wherein the set of parameters define a set of hypotheses for blind decoding to receive the retransmission; and means for receiving the retransmission by performing blind decoding based at least in part on the set of parameters.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
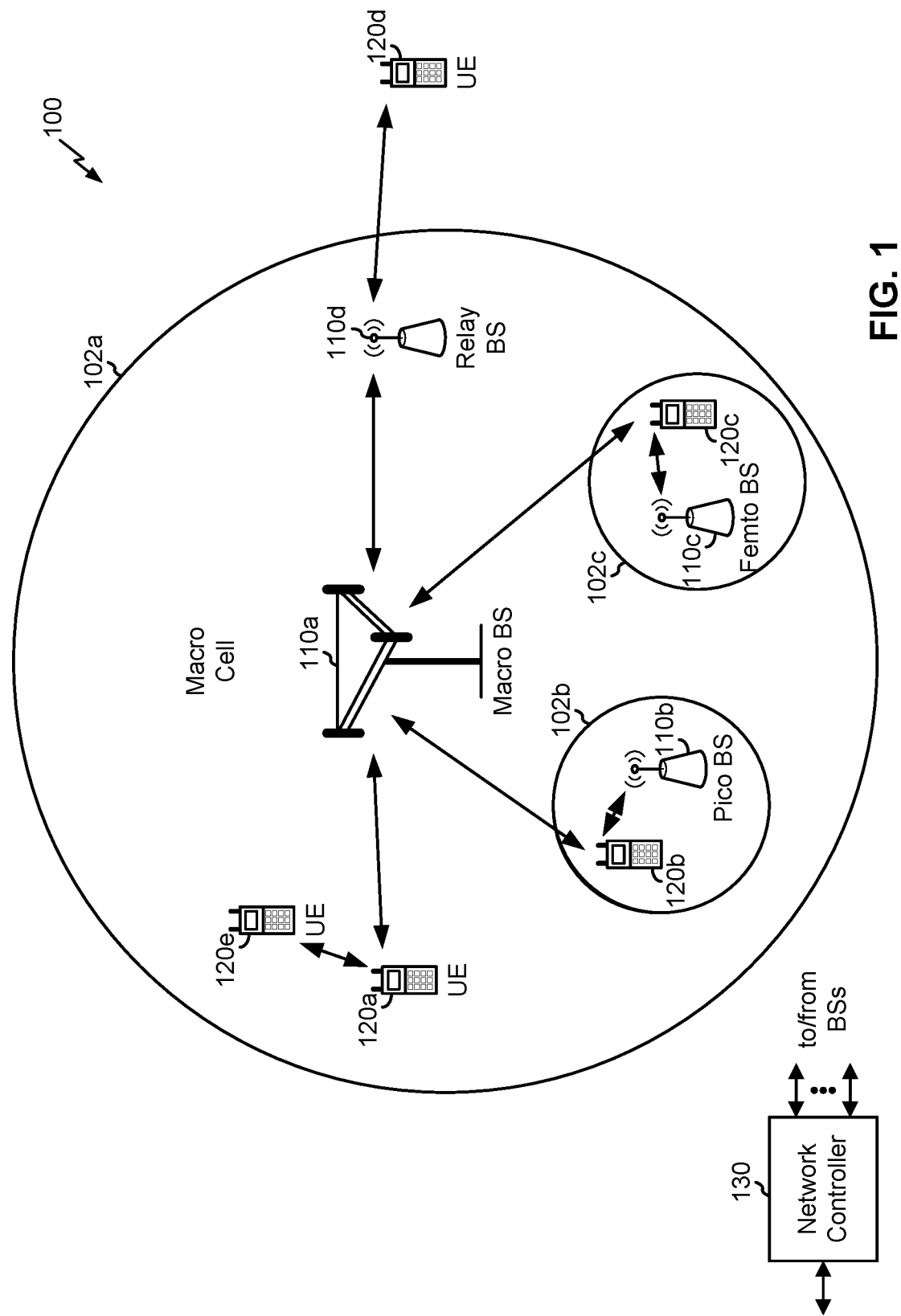
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples may differ from what is described with regard to FIG. 1.

Figure 2:
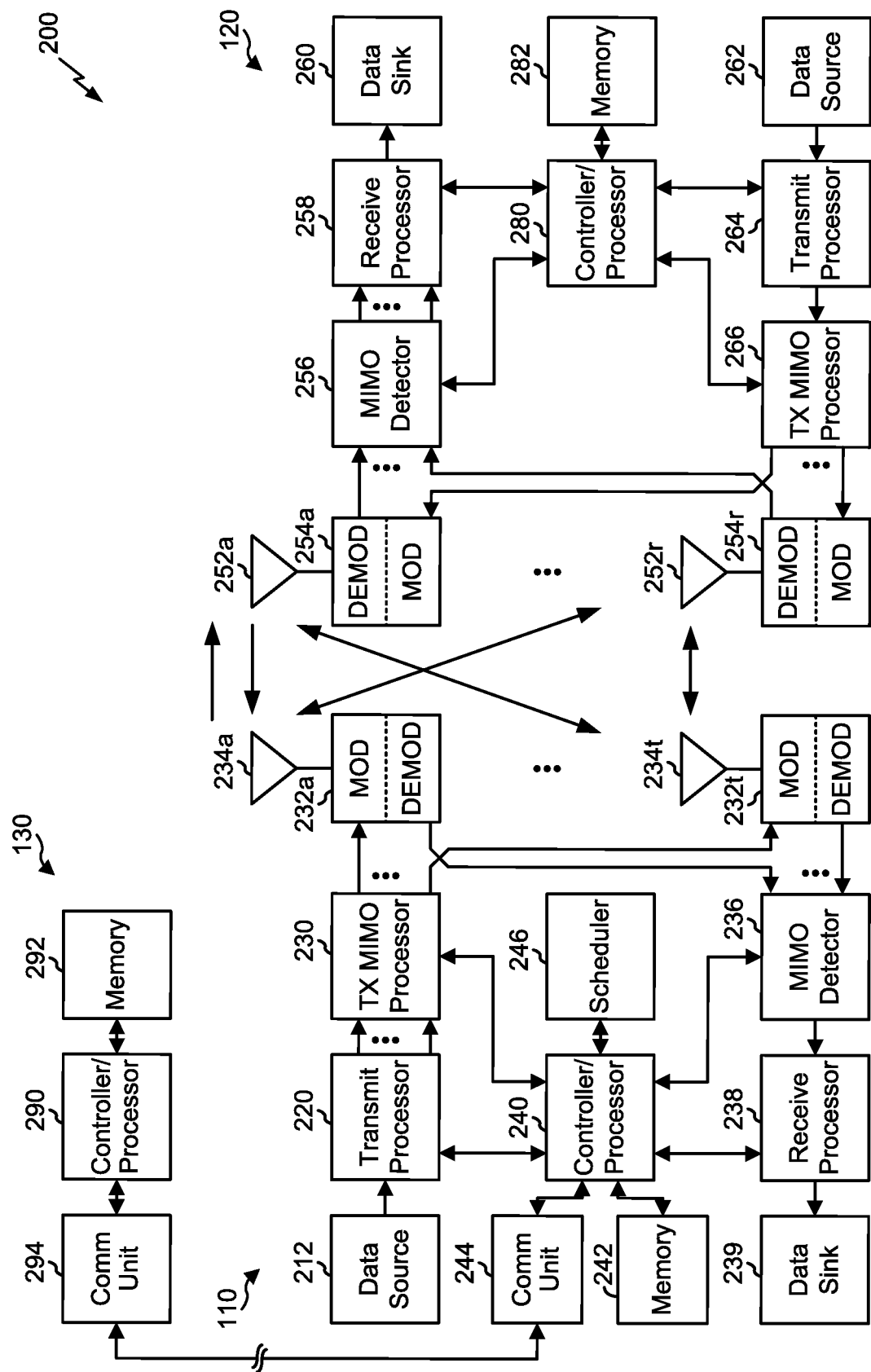
FIG. 2 is a block diagram conceptually illustrating an example of a base station in communication with a UE in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with interference muting and blind decoding for URLLC retransmissions, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving information identifying a set of parameters of a base station, wherein the set of parameters is for a retransmission of a first transmission by the base station and wherein the set of parameters define a set of hypotheses for blind decoding to receive the retransmission; means for receiving the retransmission by performing blind decoding based at least in part on the set of parameters; and/or the like. In some aspects, such means may include one or more components of UE 120 described in connection with FIG. 2.

In some aspects, base station 110 may include means for transmitting a first transmission using a first resource, means for transmitting a retransmission of the first transmission using a second resource, wherein the second resource is configured from a plurality of second resources based at least in part on an interference muting configuration of the base station; and/or the like. In some aspects, such means may include one or more components of base station 110 described in connection with FIG. 2.

As indicated above, FIG. 2 is provided merely as an example. Other examples may differ from what is described with regard to FIG. 2.

Some communications, such as ultra-reliable low latency communications (URLLC), may be associated with reliability and/or latency requirements. One approach for ensuring that reliability and/or latency requirements are satisfied is the hybrid automatic repeat request (HARQ), wherein a communication is repeated one or more times until the communication is successfully decoded by a receiver. For URLLC, a first transmission of a communication may be associated with a relatively low reliability requirement (e.g., 10e-2 and/or the like), and a subsequent transmission of the communication may be associated with a higher reliability requirement (e.g., 10e-4 and/or the like).

Inter-cell interference may pose a significant problem for URLLC, since inter-cell interference degrades signal quality and increases packet error rate (PER). Furthermore, in some deployments, such as industrial IoT (I-IoT) deployments, abrupt shadowing due to reflections and blockage may further intensify the impact of interference. One approach for reducing interference is to implement interference muting, wherein neighboring base stations are muted while a particular base station transmits a communication. However, interference muting may be inefficient in some cases, such as for a first HARQ transmission, because of spectral inefficiency associated with the small reuse factor inherent to interference muting. Therefore, there may be a tradeoff between interference muting and spectral efficiency with regard to first transmissions and/or retransmissions of URLLC communications.

Some techniques and apparatuses described herein provide for configuration of interference muting with regard to URLLC retransmissions while using a reuse factor of 1 (e.g., without interference muting) for first URLLC transmissions. This may increase spectral efficiency of the first URLLC transmissions while reducing interference with the URLLC retransmissions, thereby improving reliability of URLLC traffic. Furthermore, different BSs (or transmitting wireless communication devices) may be allocated different retransmission resources of a plurality of retransmission resources. This may enable blind decoding by recipient devices that are aware of the respective resource allocations of the different BSs, thus conserving network resources that would otherwise be used to grant resources for URLLC retransmissions.

Figure 3:
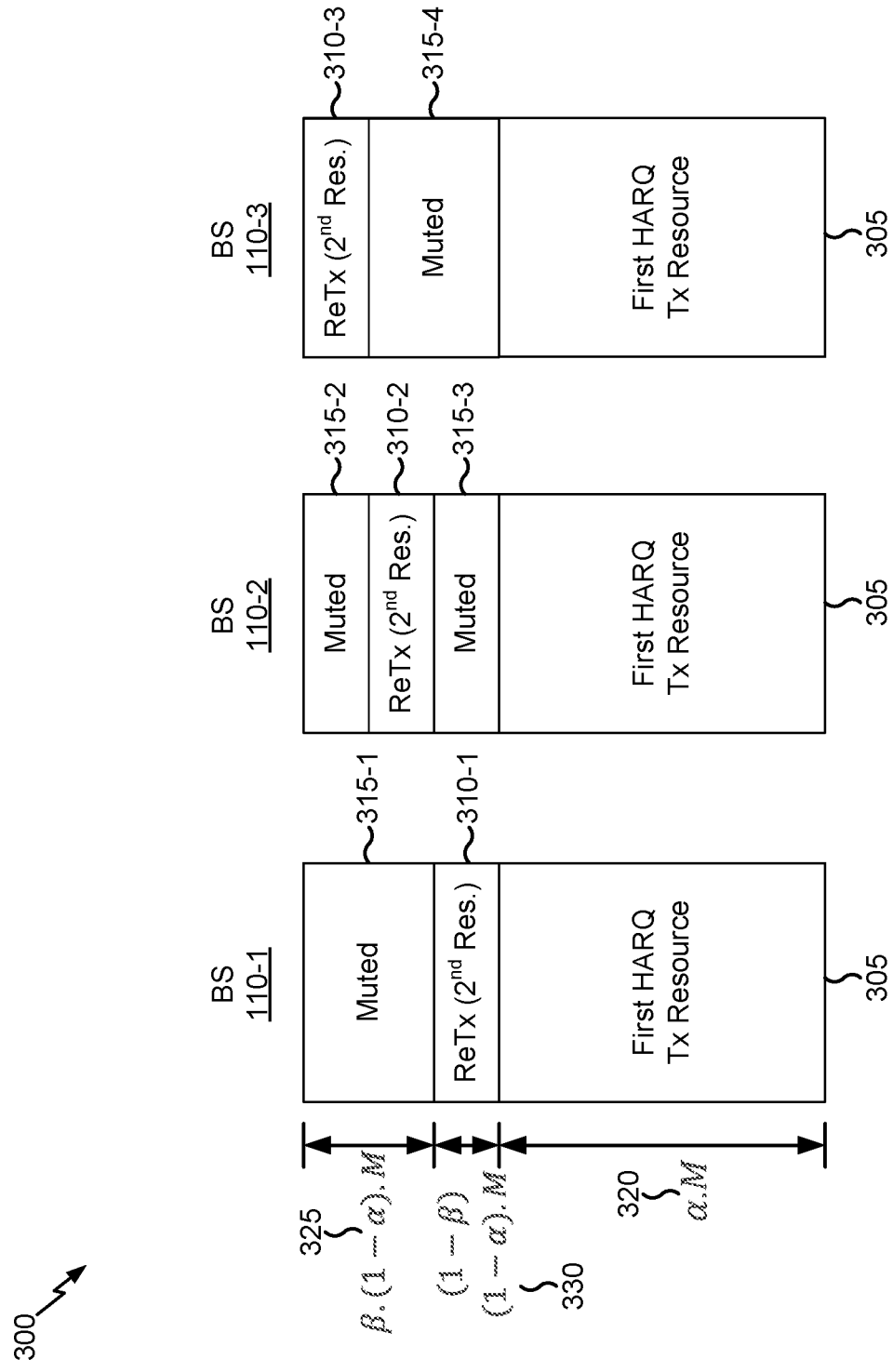
FIG. 3 is a diagram illustrating an example of resource allocations for interference muting and blind decoding for URLLC retransmissions, in accordance with various aspects of the present disclosure.

FIG. 3 is a diagram illustrating an example 300 of resource allocations for interference muting and blind decoding for URLLC retransmissions, in accordance with various aspects of the present disclosure. In FIG. 3, BSs 110-1 through 110-3 are associated with a resource allocation. For example, the resource allocation may be for a same slot and/or a same set of resource blocks (RBs).

As shown by reference number 305, the BSs 110-1 through 110-3 may be associated with a first resource (e.g., of one or more RBs). Here, the first resource is referred to as a first HARQ transmission resource. For example, each BS 110 may transmit a first transmission of a URLLC communication using the first resource. In some aspects, each BS 110 may transmit the first resource using a particular reuse factor, such as reuse-1. In other words, the BSs 110-1 through 110-3 may not perform interference muting for the first resource. In this way, the BSs 110-1 through 110-3 increase system bandwidth for the first transmission.

As shown by reference numbers 310-1 through 310-3, each BS 110 may be associated with a respective second resource (e.g., of one or more RBs). For example, the second resource of each BS 110 may be configured from a plurality of second resources. As shown by reference numbers 315-1 through 315-4, each BS 110 may be muted (e.g., may not transmit) in resources, of the plurality of second resources, other than the respective second resource. In this way, reliability of the retransmission may be improved by reducing inter-cell interference.

As shown by reference number 320, the first resource may be associated with a size $\alpha \cdot M$. Here, $\alpha$ is a ratio of a size of the first resource to a total size of the first resource and the plurality of second resources, and M is the total size of the first resource and the plurality of second resources. As shown by reference number 325, muted resources (e.g., the resources of the plurality of second resources other than the respective second resource) may be associated with a size of $\beta \cdot (1-\alpha) \cdot M$, wherein $\beta$ may be referred to herein as a muting factor. The muting factor may identify a ratio of the muted resources and the plurality of second resources. As shown by reference number 330, the respective second resource may be associated with a size of $(1-\beta) \cdot (1-\alpha) \cdot M$.

In some aspects, a wireless communication device (e.g., BS 110, network controller 130, and/or the like) may determine a value of $\alpha$ and/or $\beta$. For example, a larger value of $\alpha$ may mean that more resources are available for the first transmission. However, this leads to a smaller $\beta$ since sufficient resources for the retransmission should be reserved. For a smaller $\beta$, less interference muting may be performed, thereby causing more interference and reducing reliability of the retransmission. In some aspects, the wireless communication device may determine the values based at least in part on a target block error rate for a first transmission, an interference muting scheme, and/or a resultant block error rate for a second transmission (e.g., based at least in part on a value of $\beta$).

For example, assume that each user (e.g., recipient wireless communication device, UE, etc.) is to receive k RBs for both a first transmission and a second transmission. Assume a fixed modulation and coding scheme (MCS) and a fixed number of information bits. In that case, the number of users supported per slot may be equal to $\alpha M/k$ (based at least in part on the first transmission). Assume further that $P_1$ is a value of the first transmission's BLER (under reuse-1 with no interference muting) for the fixed MCS. In that case, an average number of users (per slot) requiring a retransmission may be equal to $P_1 \alpha M/k$. In some aspects, the UE 120 may determine the average number of users based at least in part on a tail number of users (e.g., a 90th percentile, a 75th percentile, a 10th percentile, etc.). Furthermore, a number of users that can be accommodated for the retransmission per slot may be equal to $(1-\beta) \cdot (1-\alpha) \cdot M/k$. Restated, $\beta$ may have values between 0 and $1-P_1 \alpha/(1-\alpha)$.

$P_2$ ($\beta$) may be a BLER of the retransmission, and may be a function of the muting factor $\beta$. Different muting schemes can be considered, which would determine the behavior of $P_2(\beta)$. A more preferable muting scheme may achieve a smaller $P_2$ for the same $\beta$ than a less preferable muting scheme. Therefore, one goal of determining $\alpha$ and/or $\beta$ may be to maximize $\alpha$ such that $P_1 P_2 (\beta) \leq$ target PER and $0 \leq \beta \leq 1 - P_1 \alpha/(1-\alpha)$.

In some aspects, BS 110 may determine a configuration of $\alpha$ and/or $\beta$. For example, BS 110 may determine a first resource based at least in part on a value of $\alpha$. In such a case, BS 110 may provide configuration information identifying the first resource. For example, the configuration information may include radio resource control (RRC) information and/or the like. By providing the information for the value of $\alpha$, the BS 110 may enable a UE 120 to determine the plurality of second resources from which the respective second resource can be configured. For example, the plurality of second resources may be remaining resources of a band or sub-band other than the first resource.

In some aspects, BS 110 may select or configure the respective second resource and/or the interference muting configuration. For example, neighboring BSs 110 may identify different second resources so as to reduce interference between the neighboring BSs 110. In some aspects, the neighboring BSs 110 may identify the different second resources at a time of deployment of the neighboring BSs 110 (e.g., based at least in part on configurations of the neighboring BSs 110 and an interference relationship between the neighboring BSs 110). This may conserve backhaul resources of the neighboring BSs 110 that would otherwise be used to communicate in an ongoing fashion to determine the second resources.

In some aspects, the neighboring BSs 110 may configure the second resources and/or determine the interference muting configuration based at least in part on a network listen technique using a backhaul (e.g., an X2 interface and/or the like) between the neighboring BSs 110. For example, the BSs 110 may determine interference information identifying interference between neighboring cells. In some aspects, the interference information may be represented as an interference relationship graph between different BSs 110. The graph may have C values (e.g., "colors") such that neighboring BSs 110 have different values. In that case, $\beta$ may be equal to $1-1/C$.

In some aspects, each BS 110 may select the second resource within the plurality of second resources so that the second resource does not overlap second resources of neighboring BSs 110. For example, a BS 110 may identify neighbor BSs 110 based at least in part on a network listen operation, and may identify the second resources of the neighbor BSs 110 based at least in part on relative narrowband transmit power (RNTP) indicators. In such a case, the BS 110 may signal information identifying the second resource to a UE 120 (e.g., using configuration information, such as a cell-specific RRC message) so that the UE 120 can perform blind decoding with regard to the appropriate second resource.

In some aspects, a central entity or network controller (e.g., network controller 130) may determine the second resources and/or the interference muting configuration. In some aspects, the central entity or network controller (or a BS 110) may determine different muting factors (e.g., β) for different BSs 110 based at least in part on central scheduling decisions (e.g., based at least in part on scheduling of URLLC traffic and/or the like). In such a case, a size of the second resources for each BS 110 may change or be periodically determined over time (e.g., based at least in part on a decision making interval). For example, the second resources may be determined based at least in part on relative requirements of different BSs 110 with regard to retransmission resources.

As a more particular example, assume that a UE 120 is located at a cell edge and is to receive a retransmission. For example, the retransmission may be associated with a high reliability requirement (e.g., based at least in part on being close to a delay deadline). In that case, the central entity may configure one or more neighbor BSs 110 to be muted during the second resource on which the retransmission is to be retransmitted. Conversely, assume that a UE 120 is located at a cell center and, thus, will not benefit significantly from interference muting. In that case, the central entity may not mute neighbor BSs 110 during the second resource for the retransmission. In this way, muting decisions may be performed dynamically to satisfy URLLC requirements while improving (e.g., optimizing, maximizing, etc.) capacity across BSs 110 and/or improving network communications.

In some aspects, a BS 110 may configure a set of UEs 120 to perform blind decoding with regard to a portion of a second resource. For example, the BS 110 may assign a first portion of the second resource to one or more first UEs 120 and may assign a second portion of the second resource to one or more second UEs 120. This may simplify blind decoding for the UEs 120 and increase speed of performing blind decoding.

As indicated above, FIG. 3 is provided as an example. Other examples may differ from what is described with respect to FIG. 3.

Figure 4:
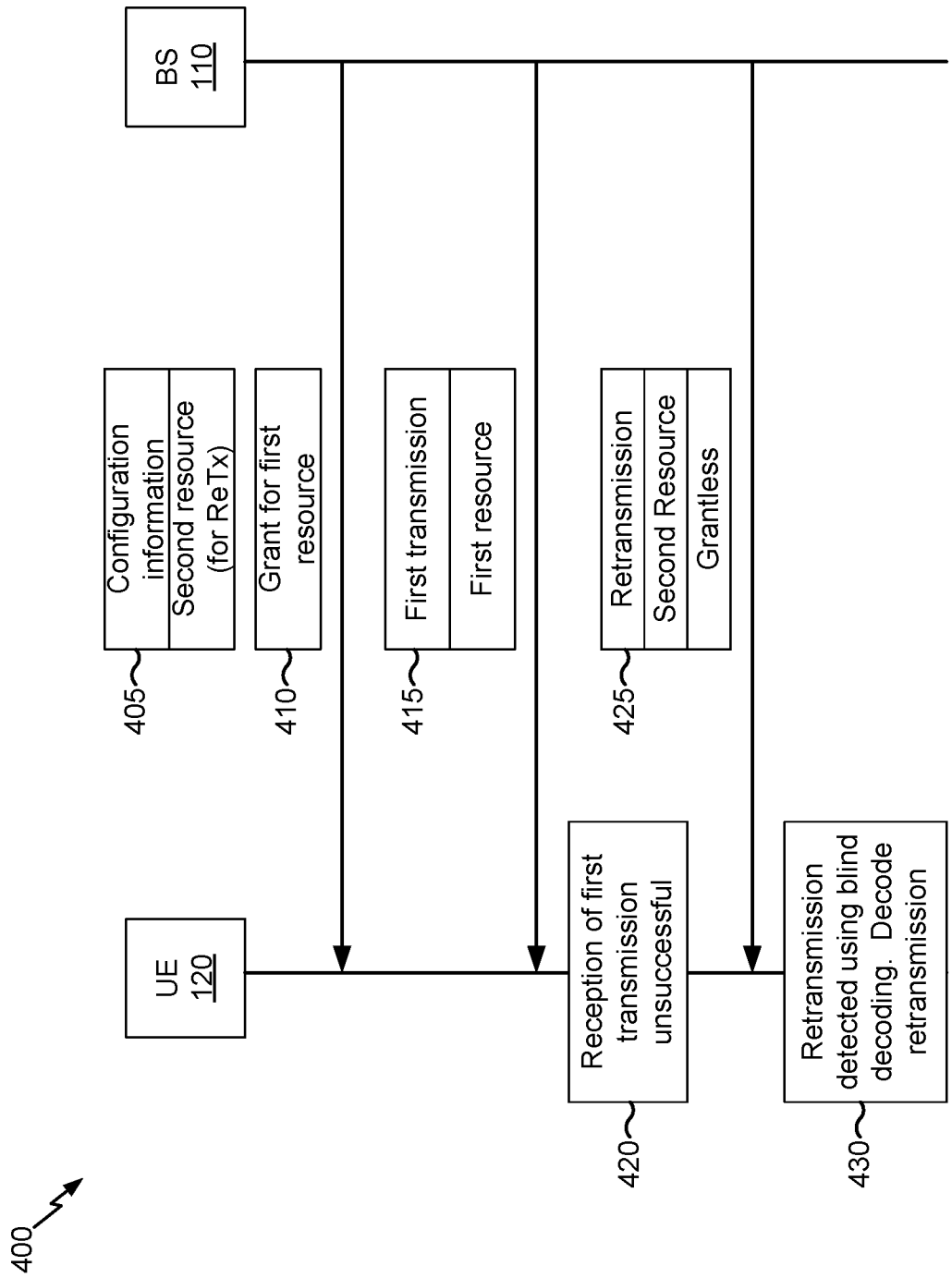
FIG. 4 is a diagram illustrating an example of blind decoding for URLLC retransmissions, in accordance with various aspects of the present disclosure.

FIG. 4 is a diagram illustrating an example 400 of blind decoding for URLLC retransmissions, in accordance with various aspects of the present disclosure. As shown, FIG. 4 includes a UE 120 and a BS 110. However, the operations described in FIG. 4 are not limited to those performed by a UE 120 and a BS 110. For example, the operations described in connection with FIG. 4 may be performed by any two or more wireless communication devices, such as the wireless communication devices described elsewhere herein.

As shown in FIG. 4, and by reference number 405, a BS 110 may provide configuration information identifying a second resource of the BS 110 (e.g., a resource for URLLC retransmissions). For example, the second resource may be part of a plurality of second resources used by a plurality of BSs 110 to retransmit URLLC communications. In some aspects, the configuration information may be provided using an RRC message and/or the like. In some aspects, the configuration information may identify a first resource (e.g., a resource in which the UE 120 is to receive a first transmission of a URLLC communication). In some aspects, the configuration information may identify a set of parameters associated with a base station. For example, the configuration information may identify the resource allocation of the second resource and/or the first resource, a modulation and coding scheme (MCS) to be used for the first resource and/or the second resource, or other information to be used for communication using the first resource and/or the second resource.

As shown by reference number 410, the UE 120 may receive a grant for the first resource. In some aspects, the first resource may be a grantless transmission, such as a semi-persistent scheduling (SPS) transmission, a periodic transmission, and/or the like, in which case the UE may not receive a grant for the first resource. This may conserve resources of the UE 120 and/or the BS 110 that would be used to signal the grant, such as downlink control resources. Conversely, using a grant-based approach for the first resource may improve flexibility of resource allocation of the first resource and the second resource.

In some aspects, the configuration information may include information for decoding the retransmission (e.g., on the second resource). For example, the configuration information may identify an MCS or a set of MCSs for the retransmission, a coding rate of the retransmission, a modulation order of the retransmission, a redundancy version of the retransmission, a number of layers of the retransmission, a set of antenna ports of the retransmission, and/or the like. This may conserve resources of the UE 120 that would otherwise be used to perform blind decoding using a larger set of MCSs.

As shown by reference number 415, the BS 110 may provide the first transmission on the first resource. For example, the BS 110 may provide the first transmission with a reuse factor of 1 and/or the like. As shown by reference number 420, the UE 120 may determine that reception of the first transmission is unsuccessful. For example, the UE 120 may fail to decode the first transmission. Accordingly, the UE 120 may determine to perform blind decoding of the second resource to receive the second transmission (not shown in FIG. 4).

As shown by reference number 425, the UE 120 may receive the retransmission on the second resource. For example, the second resource may include a plurality of assigned resources that correspond to blind decoding hypotheses. In this case, the retransmission is grantless, which may reduce overhead and enable the use of a larger aggregation level to increase reliability. In some aspects, the retransmission may be associated with a grant, which may conserve processor resources that would otherwise be used to perform blind decoding to identify the retransmission.

As shown by reference number 430, the UE 120 may detect the retransmission using blind decoding, and may decode the retransmission. In this way, the UE 120 identifies a retransmission using blind decoding based at least in part on an interference muting configuration of a BS 110. Furthermore, the interference muting configuration increases throughput of the BS 110 with regard to a first transmission, and increases reliability of a retransmission by reducing inter-cell interference of the BS 110. Thus, conformance with URLLC requirements is improved and efficiency of the UE 120 and the BS 110 is improved. As used herein, "blind decoding" may refer to receiving the retransmission without using a grant for the retransmission.

In some aspects, the UE 120 may perform the blind decoding based at least in part on a parameter. For example, the parameter may identify a modulation order, a coding rate, a redundancy version, a number of layers, a set of antenna ports, and/or the like. The UE 120 may use the parameters to perform blind decoding based at least in part on a resource allocation. For example, if three possible values of a parameter are provided for one resource allocation, the UE 120 may perform three blind decoding attempts for the resource allocation (using each of the three possible values). In some aspects, a parameter value (e.g., a redundancy version, a number of layers, or another parameter value) may be fixed so that only a single value may be used for the parameter, thereby reducing blind decoding complexity.

In some aspects, a set of blind decoding hypotheses may be defined as the union of the parameters that define the set of blind decoding hypotheses. For example, the union may be of the parameters separately (e.g., if there are three possible resource allocations and two possible modulation orders, then there may be a total of 3*2=6 blind decoding hypotheses) or jointly (e.g., hypotheses may be defined for particular combinations of parameters of different types and/or for less than all combinations of parameters of different types).

Some techniques and apparatuses described herein may be performed in the uplink or the sidelink. For example, the UE 120 may transmit a URLLC retransmission. In this case, the UE 120 may receive a grant for the retransmission, which may reduce collisions between UEs 120. For example, the grant may be provided in downlink control information (DCI) to indicate a set of RBs and/or MCSs according to which the UE 120 may perform blind decoding. In some aspects, the URLLC retransmission may be grantless, which reduces overhead associated with the URLLC retransmission.

As indicated above, FIG. 4 is provided as an example. Other examples may differ from what is described with respect to FIG. 4.

Figure 5:
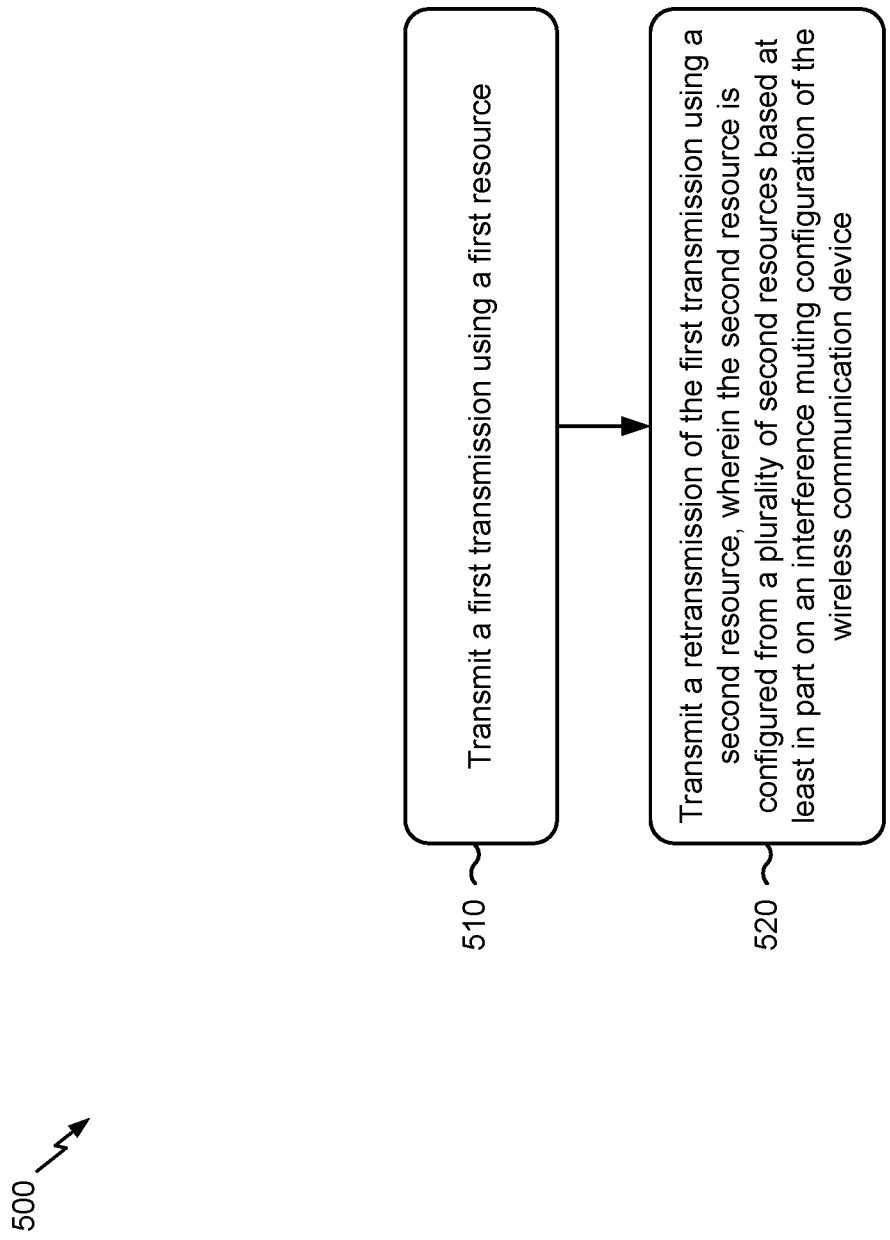
FIG. 5 is a diagram illustrating an example process performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example where a wireless communication device (e.g., BS 110, UE 120, and/or the like) performs retransmission of URLLC communications based at least in part on an interference muting configuration.

As shown in FIG. 5, in some aspects, process 500 may include transmitting a first transmission using a first resource (block 510). For example, the wireless communication device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a first transmission. For example, the first transmission may be a first transmission of a URLLC HARQ communication. The first transmission may be transmitted using a first resource. For example, the first transmission and/or the first resource may be associated with a particular reuse factor, such as reuse-1.

As shown in FIG. 5, in some aspects, process 500 may include transmitting a retransmission of the first transmission using a second resource, wherein the second resource is configured from a plurality of second resources based at least in part on an interference muting configuration of the wireless communication device (block 520). For example, the wireless communication device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit a retransmission of the first transmission. The wireless communication device may transmit the retransmission using a second resource. For example, the second resource may be configured from a plurality of second resources. The second resource may be configured based at least in part on an interference muting configuration of the wireless communication device.

Process 500 may include additional aspects, such as any single aspect and/or any combination of aspects described below and/or in connection with one or more other processes described elsewhere herein.

In some aspects, the wireless communication device is one of a set of wireless communication devices, and each wireless communication device, of the set of wireless communication devices, is configured to transmit using corresponding resources of the plurality of second resources. In some aspects, each wireless communication device, of the set of wireless communication devices, is configured to be muted in resources of the plurality of second resources other than the corresponding resources. In some aspects, the corresponding resources are allocated or selected based at least in part on a network listen technique performed by the set of wireless communication devices. In some aspects, the corresponding resources are allocated or selected statically or semi-statically. In some aspects, the corresponding resources are allocated or selected to reduce interference between neighboring wireless communication devices, of the set of wireless communication devices, with regard to retransmissions of the set of wireless communication devices. In some aspects, the corresponding resources are allocated by a central entity. In some aspects, the corresponding resources are selected by at least one wireless communication device of the set of wireless communication devices. In some aspects, each wireless communication device, of the set of wireless communication devices, is configured to transmit first transmissions using the first resources, the first resources including the first resource.

In some aspects, the plurality of second resources is semi-statically configured. In some aspects, a size of the second resource is based at least in part on at least one of the interference muting configuration, a block error rate associated with the first transmission, or a block error rate of the retransmission. In some aspects, the first resource is fixed. In some aspects, the plurality of second resources is cell-specific. In some aspects, the second resource is cell-specific. In some aspects, information identifying the second resources is provided to one or more recipient wireless communication devices for blind decoding of the retransmission with regard to the second resources. In some aspects, information identifying the plurality of second resources is signaled using radio resource control (RRC) messaging.

In some aspects, the retransmission is based at least in part on downlink control information identifying the second resource and a modulation and coding scheme (MCS) for the retransmission. In some aspects, information identifying the interference muting configuration is signaled from a central entity that is in communication with a plurality of wireless communication devices, the plurality of wireless communication devices including the wireless communication device. In some aspects, the interference muting configuration is based at least in part on a number of user equipments that require a retransmission in a time period, a delay budget parameter, a packet error rate parameter, or a signal quality parameter.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
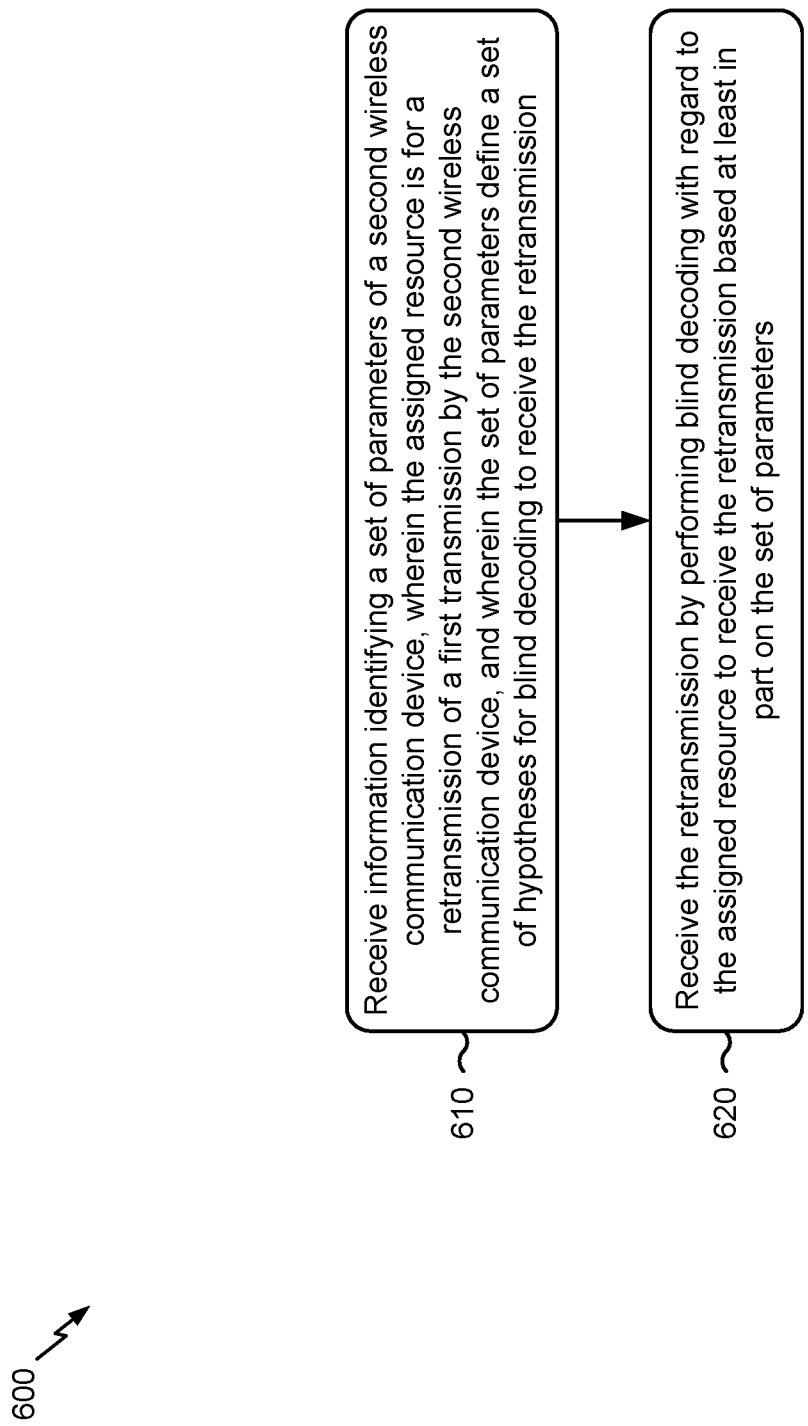
FIG. 6 is a diagram illustrating an example process performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where a first wireless communication device (e.g., BS 110, UE 120, the wireless communication device of process 500, and/or the like) performs blind decoding based at least in part on an interference muting configuration. In some aspects, the first wireless communication device may be a UE, the second wireless communication device may be a base station, and the set of second wireless communication devices may be a set of base stations.

As shown in FIG. 6, in some aspects, process 600 may include receiving information identifying a set of parameters of a second wireless communication device, wherein the assigned resource is for a retransmission of a first transmission by the second wireless communication device, and wherein the set of parameters define a set of hypotheses for blind decoding to receive the retransmission (block 610). For example, the first wireless communication device (e.g., using antenna 252, DEMOD 254, MIMO detector 256, receive processor 258, controller/processor 280, antenna 234, DEMOD 232, MIMO detector 236, receive processor 238, controller/processor 240, and/or the like) may receive information identifying a set of parameters of a second wireless communication device (e.g., BS 110, UE 120, the wireless communication device of process 500, and/or the like). The set of parameters may be for a retransmission of a first transmission of the second wireless communication device. For example, the first transmission and the retransmission may be associated with a URLLC HARQ configuration. In some aspects, the set of parameters may include information identifying an assigned resource for the retransmission. In some aspects, the assigned resource may be a subset of a set of retransmission resources for a set of second wireless communication devices including the second wireless communication device. For example, the set of retransmission resources may include the plurality of second resources described elsewhere herein. In some aspects, the information identifying the assigned resource may comprise radio resource control (RRC) information.

As shown in FIG. 6, in some aspects, process 600 may include receiving the retransmission by performing blind decoding based at least in part on the set of parameters (block 620). For example, the first wireless communication device (e.g., using controller/processor 240, controller/processor 280, DEMOD 232, MIMO detector 236, receive processor 238, DEMOD 254, MIMO detector 256, receive processor 258, and/or the like) may receive the retransmission by performing blind decoding based at least in part on the set of parameters. For example, the first wireless communication device may perform the blind decoding based at least in part on an interference muting configuration of the second wireless communication device. In some aspects, blind decoding may comprise receiving the retransmission without a grant for the retransmission. In this way, the first wireless communication device conserves resources of the first wireless communication device and/or the second wireless communication device that would otherwise be used to grant the retransmission.

Process 600 may include additional aspects, such as any single aspect and/or any combination of aspects described below and/or in connection with one or more other processes described elsewhere herein.

In some aspects, blind decoding is performed based at least in part on the first transmission being unsuccessful. In some aspects, the first transmission is associated with a semi-persistent scheduling grant. In some aspects, the information identifying the assigned resource is provided to a set of first wireless communication devices associated with the second wireless communication device. In some aspects, blind decoding is only performed with regard to resources of the assigned resource.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving information identifying a set of parameters of a base station,
wherein the set of parameters is for a retransmission of a first transmission by the base station,
wherein the set of parameters define a set of hypotheses for blind decoding to receive the retransmission and include information identifying an assigned resource for the retransmission, and
wherein a size of the assigned resource is determined based at least in part on:
a total size of resources used for the first transmission, the assigned resource, and muted resources,
a muting factor, and
a ratio of a size of the resources used for the first transmission to the total size,
wherein the ratio is based at least in part on a target packet error rate, the muting factor, a first block error rate associated with the first transmission, and a second block error rate associated with the retransmission; and
receiving the retransmission using the assigned resource by performing blind decoding based at least in part on the set of parameters.

2. The method of claim 1, wherein the assigned resource comprises a plurality of assigned resources that correspond to the set of hypotheses.

3. The method of claim 1, wherein blind decoding is performed only with regard to resources of the assigned resource.

4. The method of claim 1, wherein the information identifying the assigned resource is provided to a set of UEs associated with the base station.

5. The method of claim 1, wherein the information identifying the assigned resource comprises radio resource control (RRC) configuration information.

6. The method of claim 1, wherein blind decoding comprises receiving the retransmission without a grant for the retransmission.

7. The method of claim 1, wherein blind decoding is performed based at least in part on the first transmission being unsuccessful.

8. The method of claim 1, wherein the first transmission is associated with a semi-persistent scheduling grant.

9. The method of claim 1, wherein the set of parameters identifies at least one of:
a modulation order of the retransmission,
a coding rate of the retransmission,
a redundancy version of the retransmission,
a number of layers of the retransmission,
a set of antenna ports of the retransmission.

10. The method of claim 1, wherein a parameter, of the set of parameters, is fixed or associated with a single hypothesis of the set of hypotheses.

11. A method of wireless communication performed by a base station, comprising:
transmitting a first transmission using a first resource, wherein interference muting is not performed for the first resource; and
transmitting a retransmission of the first transmission using a second resource,
wherein the second resource is configured from a plurality of second resources based at least in part on an interference muting configuration of the base station, and
wherein a size of the second resource is determined based at least in part on:
a total size of resources used for the first transmission, the second resource, and muted resources,
a muting factor, and
a ratio of a size of the resources used for the first transmission to the total size,
wherein the ratio is based at least in part on a target packet error rate, the muting factor, a first block error rate associated with the first transmission, and a second block error rate associated with the retransmission.

12. The method of claim 11, wherein the base station is one of a set of base stations, and wherein each base station, of the set of base stations, is configured to transmit using corresponding resources of the plurality of second resources.

13. The method of claim 12, wherein the corresponding resources are allocated or selected statically or semi-statically.

14. The method of claim 12, wherein the corresponding resources are allocated by a central entity.

15. The method of claim 12, wherein the corresponding resources are selected by at least one base station of the set of base stations.

16. The method of claim 12, wherein each base station, of the set of base stations, is configured to transmit first transmissions using first resources, the first resources including the first resource.

17. The method of claim 11, wherein the plurality of second resources is semi-statically configured.

18. The method of claim 11, wherein the first resource is fixed.

19. The method of claim 11, wherein the plurality of second resources is cell-specific.

20. The method of claim 11, wherein information identifying the plurality of second resources is provided to one or more user equipments (UEs) for blind decoding of the retransmission with regard to the plurality of second resources.

21. The method of claim 11, wherein information identifying the plurality of second resources is signaled using radio resource control (RRC) messaging.

22. A user equipment (UE) for wireless communication, comprising:
a memory; and
one or more processors operatively coupled to the memory, the memory and the one or more processors to:
receive information identifying a set of parameters of a base station,
wherein the set of parameters is for a retransmission of a first transmission by the base station,
wherein the set of parameters define a set of hypotheses for blind decoding to receive the retransmission and include information identifying an assigned resource for the retransmission, and
wherein a size of the assigned resource is determined based at least in part on:
a total size of resources used for the first transmission, the assigned resource, and muted resources,
a muting factor, and
a ratio of a size of the resources used for the first transmission to the total size,
wherein the ratio is based at least in part on a target packet error rate, the muting factor, a first block error rate associated with the first transmission, and a second block error rate associated with the retransmission; and
receive the retransmission using the assigned resource by performing blind decoding based at least in part on the set of parameters.

23. The UE of claim 22, wherein blind decoding is only performed with regard to resources of the assigned resource.

24. The UE of claim 22, wherein the information identifying the assigned resource is provided to a set of UEs associated with the base station.

25. A non-transitory computer-readable medium storing one or more instructions for wireless communication, the one or more instructions comprising:
one or more instructions that, when executed by one or more processors of a user equipment (UE), cause the one or more processors to:
receive information identifying a set of parameters of a base station,
wherein the set of parameters is for a retransmission of a first transmission by the base station,
wherein the set of parameters define a set of hypotheses for blind decoding to receive the retransmission and include information identifying an assigned resource for the retransmission, and
wherein a size of the assigned resource is determined based at least in part on:
a total size of resources used for the first transmission, the assigned resource, and muted resources,
a muting factor, and
a ratio of a size of the resources used for the first transmission to the total size,
wherein the ratio is based at least in part on a target packet error rate, the muting factor, a first block error rate associated with the first transmission, and a second block error rate associated with the retransmission; and
receive the retransmission by performing blind decoding based at least in part on the set of parameters.

26. The non-transitory computer-readable medium of claim 25, wherein the assigned resource is a subset of a set of retransmission resources for retransmissions by a set of base stations including the base station.

27. The non-transitory computer-readable medium of claim 25, wherein the information identifying the assigned resource is provided to a set of UEs associated with the base station.

28. The method of claim 1, wherein the size of the assigned source is associated with a size of $(1-\beta)\cdot(1-\alpha)\cdot M$,
wherein $\beta$ is the muting factor, $\alpha$ is the ratio, and M is the total size.

29. The method of claim 1, wherein the ratio $\alpha$ satisfies: $P_1 P_2(\beta) \leq$ target PER and $0 \leq 1-P_1\alpha/(1-\alpha)$,
wherein $\beta$ is the muting factor, $P_1$ is the first block error rate, $P_2$ is the second block error rate, and target PER is the target packet error rate.

30. The method of claim 1, wherein the ratio $\alpha$ is maximized to satisfy: $P_1 P_2(\beta) \leq$ target PER and $0 \leq \beta \leq 1-P_1\alpha/(1-\alpha)$,
wherein $\beta$ is the muting factor, $P_1$ is the first block error rate, $P_2$ is the second block error rate, and target PER is the target packet error rate.

* * * * *